(12) United States Patent
Ito

(10) Patent No.: US 8,052,215 B2
(45) Date of Patent: Nov. 8, 2011

(54) SEAT RECLINING APPARATUS FOR VEHICLE

(75) Inventor: Sadao Ito, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 317 days.

(21) Appl. No.: 12/409,118

(22) Filed: Mar. 23, 2009

(65) Prior Publication Data
US 2009/0278392 A1 Nov. 12, 2009

(30) Foreign Application Priority Data
May 8, 2008 (JP) .................. 2008-121994

(51) Int. Cl.
*B60N 2/02* (2006.01)
(52) U.S. Cl. ............... 297/362.11; 297/362; 297/354.12
(58) Field of Classification Search ............. 297/362, 297/362.11, 354.12
See application file for complete search history.

(56) References Cited

U.S. PATENT DOCUMENTS

| | | | | |
|---|---|---|---|---|
| 4,541,672 A * | 9/1985 | Fukuta et al. | ............. | 297/367 R |
| 4,795,213 A * | 1/1989 | Bell | .................. | 297/367 R |
| 5,090,264 A * | 2/1992 | Droulon et al. | .................. | 74/411 |
| 5,685,610 A * | 11/1997 | Minai | ............. | 297/364 |
| 5,967,611 A * | 10/1999 | York et al. | ............. | 297/368 |
| 6,023,994 A * | 2/2000 | Yoshida | ............. | 74/530 |
| 6,712,429 B2 * | 3/2004 | Villarroel | ............. | 297/361.1 |
| 2002/0011748 A1 | 1/2002 | Ito et al. | | |

FOREIGN PATENT DOCUMENTS

| | | |
|---|---|---|
| JP | 61-60753 | 4/1986 |
| JP | 63-120944 | 8/1988 |
| JP | 2001-340153 | 12/2001 |

* cited by examiner

*Primary Examiner* — David Dunn
*Assistant Examiner* — Erika Garrett
(74) *Attorney, Agent, or Firm* — Oblon, Spivak, McClelland, Maier & Neustadt, L.L.P.

(57) ABSTRACT

A seat reclining apparatus includes first and second angle adjusting mechanisms, a connecting shaft being eccentric to a center of a rotating shaft of the first and second angle adjusting mechanisms, a first actuating mechanism including a first transmitting device, a second actuating mechanism including a second transmitting device, an electric drive source supplying a drive force to the first actuating mechanism, the connecting shaft transmitting the drive force from the first actuating mechanism to the second actuating mechanism, a first housing accommodating the first actuating mechanism and a second housing accommodating the second actuating mechanism.

9 Claims, 6 Drawing Sheets

23: Connecting shaft,
23a: First end portion
26: Electric motor (Electric driver source)
29: Housing case (First housing)
30: Housing cover (First housing)
35: First actuating mechanism
36: Driving sprocket (First connecting shaft side rotating member)
37: Driven sprocket (First rotating shaft side rotating member)
38: Chain belt (First transmitting means)

SEAT RECLINING APPARATUS FOR VEHICLE

CROSS REFERENCE TO RELATED APPLICATIONS

This application is based on and claims priority under 35 U.S.C. §119 to Japanese Patent Application 2008-121994, filed on May 8, 2008, the entire contents of which is incorporated herein by reference.

FIELD OF THE INVENTION

The present invention relates to a seat reclining apparatus for a vehicle.

BACKGROUND

Various types of seat reclining apparatus for vehicle have been proposed so far. For example, a reclining apparatus disclosed in JP61-60753U includes two recliners (angle adjusting mechanisms) each of which having a rotating shaft and used for adjusting an angle of a seat back relative to a seat cushion. One recliner is provided at one side of a vehicle seat in a seat width direction, and the other recliner is provided at the other side of the vehicle seat in the seat width direction, and each rotating shaft of the recliner has an identical rotation axis. The reclining apparatus further includes a connecting shaft positioned between the recliners in order to transmit a drive force from the one recliner to the other recliner. The connecting shaft is positioned in a manner where its rotation axis is eccentric to that of the rotating shafts. The reclining apparatus also includes a gear mechanism provided between each rotating shaft and the connecting shaft in order to transmit the rotation. Because the rotating shaft of each recliner is positioned so as to be eccentric to the connecting shaft, the seat may be relatively easily mounted to the vehicle, and a certain portion of the seat underwhich the rotating shafts and the connecting shaft are provided may not interfere with a passenger's hip, which increases comfortability of the seat.

Another reclining apparatus disclosed in JP63-120944U includes a recliner (angle adjusting mechanism) having a rotating shaft and a motor having a reduction gear and being distanced from the recliner. The rotating shaft of the recliner is eccentric to an output shaft of the motor, and a rotation of the motor is transmitted from the output shaft thereof to the rotating shaft of the recliner by means of a chain. The reclining apparatus also includes a reducing mechanism serving as a stopper to limit an actuation of a seat back so as not to move toward foremost and rearmost positions.

According to the reclining apparatus disclosed in JP61-60753U, during an assembly process, because a plurality of gears comprising the gear mechanism needs to be set in a certain order to a bracket provided at the seat cushion or a bracket provided at the seat back, variations may occur during the assembly process. Such variations may be accumulated; as a result, a level of an assembly precision may be decreased. Furthermore, a level of synchronization between the recliners may be decreased. According to the reclining apparatus disclosed in JP63-120944U, it is not mentioned that a drive force is transmitted between the recliners one of which is provided at one side of the seat and the other is provided at the other side of the seat. Accordingly, the assembly precision and the synchronization may not be of concern.

A need thus exists for a seat reclining apparatus for a vehicle which is not susceptible to the drawback mentioned above.

SUMMARY OF THE INVENTION

According to an aspect of the present invention, a seat reclining apparatus for vehicle includes a first angle adjusting mechanism provided at one side of a seat in a seat width direction, a second angle adjusting mechanism provided at the other side of the seat in the seat width direction, the first angle adjusting mechanism and the second angle adjusting mechanism for adjusting an angle of a second frame relative to a first frame, the first frame forming a main structure of a first portion of the seat, and the second frame forming a main structure of a second portion of the seat, a connecting shaft provided so as to extend in the seat width direction and being eccentric to a center of a rotating shaft of each of the first angle adjusting mechanism and the second angle adjusting mechanism, a first actuating mechanism including a first rotating shaft side rotating member rotating relative to the center of the rotating shaft of the first angle adjusting mechanism, a first connecting shaft side rotating member rotating so as to be integral with a first end portion of the connecting shaft and a first transmitting device for transmitting the rotation between the first rotating shaft side rotating member and the first connecting shaft side rotating member, a second actuating mechanism including a second rotating shaft side rotating member rotating relative to the center of the rotating shaft of the second angle adjusting mechanism, a second connecting shaft side rotating member rotating so as to be integral with a second end portion of the connecting shaft and a second transmitting device for transmitting the rotation between the second rotating shaft side rotating member and the second connecting shaft side rotating member, an electric drive source supplying a drive force to the first actuating mechanism to be driven, the connecting shaft transmitting the drive force supplied to the first actuating mechanism to the second actuating mechanism, a first housing housing the first actuating mechanism and into which the first end portion of the connecting shaft is inserted and a second housing housing the second actuating mechanism and into which the second end portion of the connecting shaft is inserted.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
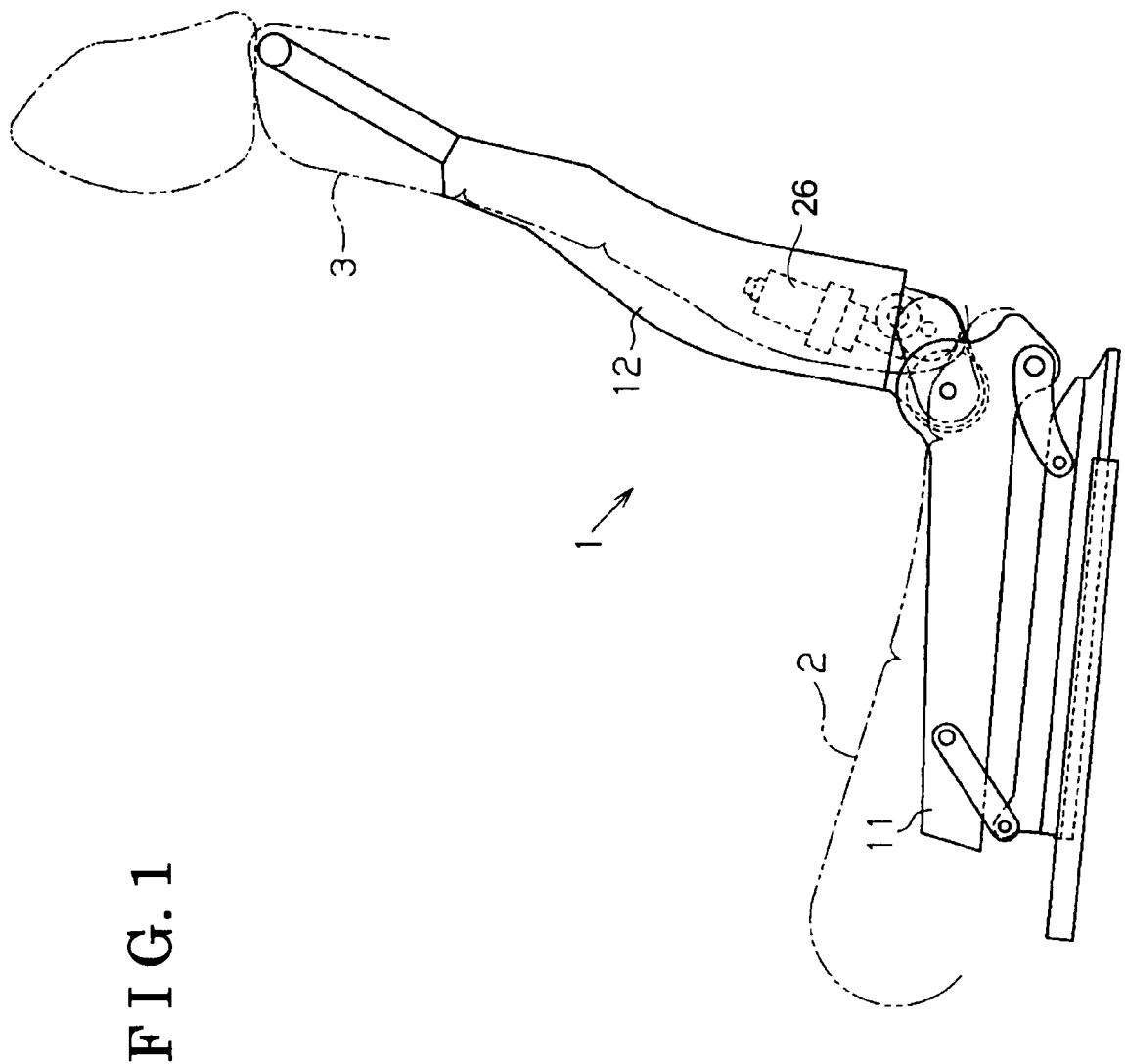
FIG. 1 illustrates a side view indicating an embodiment related to the present invention.
Figure 2:
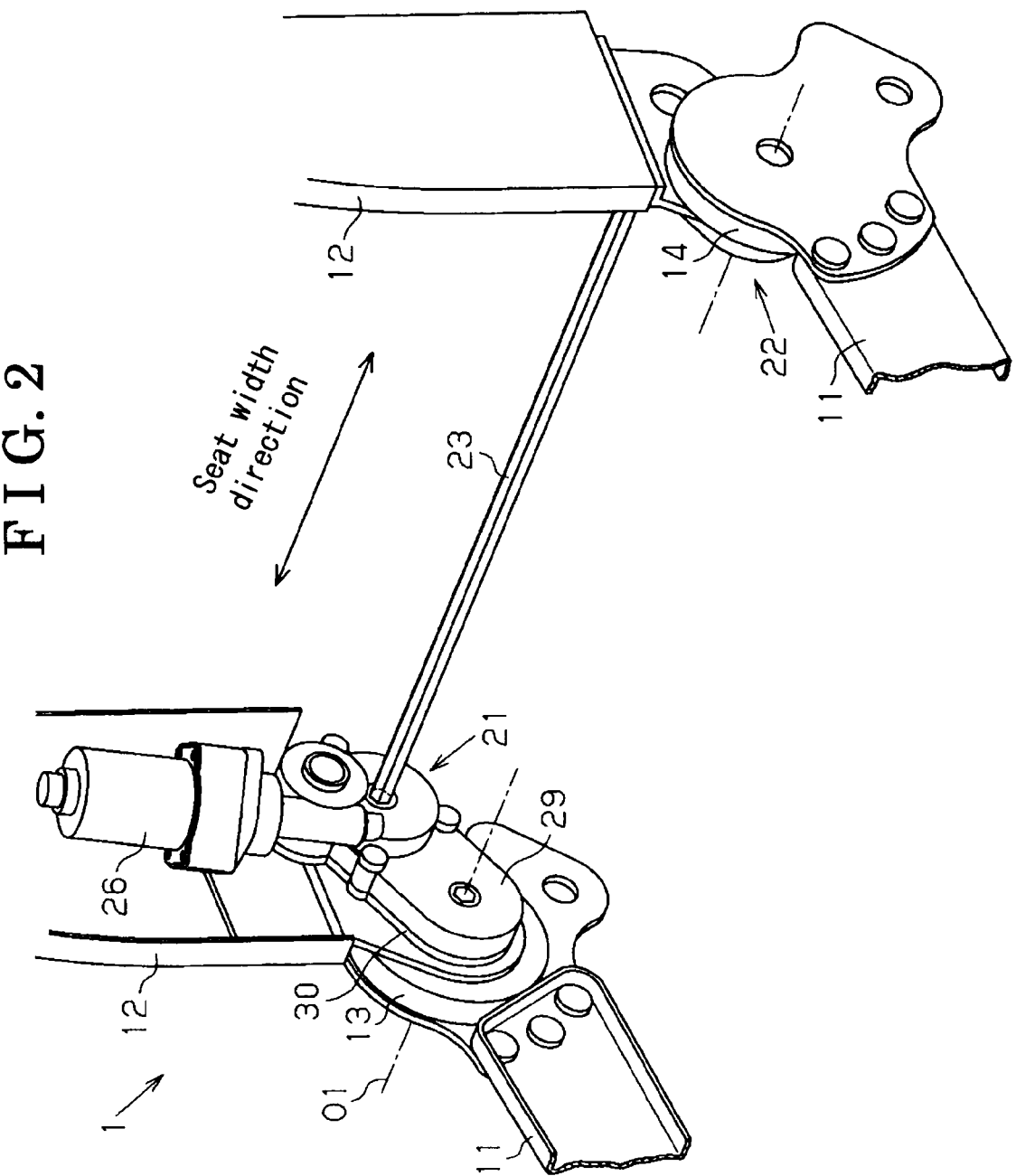
FIG. 2 illustrates an exploded perspective view indicating the embodiment.

An embodiment of a reclining seat mounted to a vehicle such as an automobile will be explained in accordance with drawings attached hereto. A drawing illustrated in FIG. 1 indicates a side view indicating a main structure of a vehicle seat 1 (hereinafter simply referred to as a seat 1) in the embodiment, and a drawing illustrated in FIG. 2 indicates a perspective view indicating the main structure of the seat 1 in the embodiment. As indicated in the drawings, the seat 1 includes a seat cushion 2 serving as a first portion, a seat back 3 serving as a second portion, a pair of seat cushion frames 11 serving as a first frame and a pair of seat back frames 12 serving as a second frame. In this example, each seat cushion frame 11 is made of a metal plate, and one seat cushion frame 11 is provided at one side (e.g., the right side) of the seat 1 in a seat width direction, and the other seat cushion frame 11 is provided at the other side (e.g., the left side) of the seat 1 in the seat width direction. The pair of seat cushion frames 11 forms a main structure of the seat cushion 2. In this example, each seat back frame 12 is also made of a metal plate, and one seat back frame 12 is provided at the one side (e.g., the right side) of the seat 1 in a seat width direction, and the other seat back frame 12 is provided at the other side (e.g., the left side) of the seat 1 in the seat width direction. The pair of seat back frames 12 forms a main structure of the seat back 3. The one seat back frame 12 is connected to the one seat cushion frame 11 so as to pivot by means of a reclining mechanism 13 serving as a first angle adjusting mechanism, and the other seat back frame 12 is connected to the other seat cushion frame 11 so as to pivot by means of a reclining mechanism 14 serving as a second angle adjusting mechanism. Each of the reclining mechanisms 13 and 14 is comprised of a known gear mechanism including a first geared frame having an internal gear and a second geared frame having an external gear. In this embodiment, the first geared frame with the internal gear is attached to the seat back frame 12, and the second geared frame with the external gear is attached to the seat cushion frame 11. The number of teeth of the external gear is smaller than that of the internal gear, and the external gear and the internal gear are meshing each other. A cam serving as a rotating shaft is provided for controlling a meshing manner between the internal gear and the external gear. In this configuration, as the cam is rotated relative to the rotation axis 01, the angle of the seat back frame 12 relative to the seat cushion frame 11 may be continuously adjusted.

A motor side actuating apparatus 21 is provided at the seat back frame 12 provided at the side of the reclining mechanism 13, and a driven side actuating apparatus 22 is provided at the seat back frame 12 provided at the side of the reclining mechanism 14. Furthermore, a connecting shaft 23 is provided so as to extend in a seat width direction between the motor side actuating apparatus 21 and the driven side actuating apparatus 22. The connecting shaft 23 is formed so as to have a multangular cross section, and a drive force is transmitted from the motor side actuating apparatus 21 to the driven side actuating apparatus 22 by means of the connecting shaft 23. An axis of the connecting shaft 23 is eccentric to the rotating shaft of each reclining mechanism 13 and 14 (the rotation axis 01).

Figure 3:
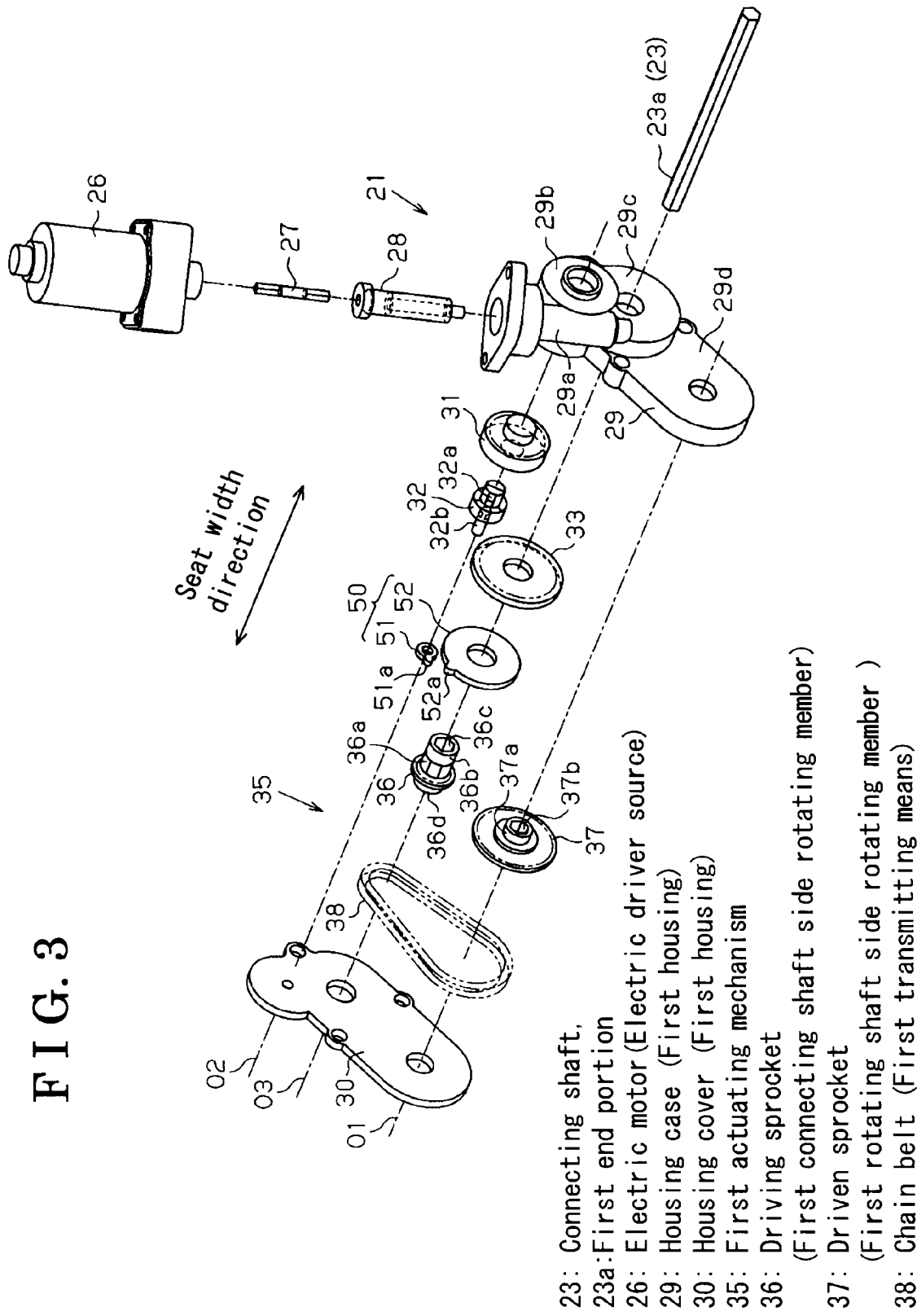
FIG. 3 illustrates an exploded perspective view indicating the embodiment.

A drawing illustrated in FIG. 3 indicates an exploded perspective view of the motor side actuating apparatus 21. As illustrated in the drawing of FIG. 3, the motor side actuating apparatus 21 includes an electric motor 26 serving as an electric drive source, a motor connecting shaft 27 and a worm 28. One end portion of the motor connecting shaft 27 is fit to a rotating shaft of the electric motor 26, and the other end portion of the motor connecting shaft 27 is fit to the worm 28. In other word, the motor connecting shaft 27 connects the rotating shaft of the electric motor 26 to the worm 28 so that the rotating shaft of the electric motor 26, the motor connecting shaft 27 and the worm 28 rotate integrally. The motor side actuating apparatus 21 further includes a housing case 29 and a housing cover 30. The housing case 29 is made of resin so as to form an external shape of the motor side actuating apparatus 21, and the housing cover 30 is formed and provided so as to cover an opening portion of the housing case 29. The housing case 29 and the housing cover 30 constitute a first housing. The housing case 29 includes a worm housing 29a, a wheel housing 29b and a gear housing 29c. The worm housing 29a houses the worm 28 so as to be rotatable, the wheel housing 29b is formed in a cylinder shape with a bottom whose center point is identical to a rotation axis 02 that is parallel to the rotation axis 01, and the gear housing 29c is also formed in a cylinder shape with a bottom whose center point is identical to a rotation axis 03 that is parallel to the rotation axis 01 and the rotation axis 02. The worm housing 29a internally communicates with the wheel housing 29b, and the wheel housing 29b internally communicates with the gear housing 29c. The housing case 29 further includes a housing main body 29d formed so as to extend from the gear housing 29c toward the front of the seat 1. A front end portion of the housing main body 29d is formed in a half-cylinder shape with a bottom whose central point is identical to the rotation axis 01, and a rear end portion of the housing main body 29d communicates with the gear housing 29c and the wheel housing 29b.

A worm wheel 31 meshing with the worm 28 is housed in and supported by the wheel housing 29b so as to be rotatable relative to the rotation axis 02. The worm 28 and the worm wheel 31 (e.g., serving as a worm gear) constitute a first stage of a reducing mechanism. The wheel housing 29b further houses a pinion gear 32 (e.g., a first gear) whose axis is identical to that of the worm wheel 31. A serrated shaft 32a is formed at one side of the pinion gear 32 so as to face the worm wheel 31, and a shaft portion 32b is formed at the other side of the pinion gear 32 so as to face the housing cover 30. The pinion gear 32 is connected to the worm wheel 31 at the serrated shaft 32a so as to be rotatable integrally with the worm wheel 31. A driving cam 51 made of a plate material is serration fit to the shaft portion 32b of the pinion gear 32, and the pinion gear 32 is rotatably supported by the housing cover 30 at the shaft portion 32b.

The gear housing 29c houses a gear 33 (e.g., a second gear) so as to be rotatable relative to the rotation axis 03. The gear 33 meshes with the pinion gear 32, and a diameter of the gear 33 is larger than that of the pinion gear 32. The pinion gear 32 and the gear 33 constitute a second stage of the reducing mechanism. The gear housing 29c further houses a driven cam 52 so as to be rotatable relative to an axis of the gear 33. The driven cam 52 is made of a plate material that is engagable with the driving cam 51. The driving cam 51 and the driven cam 52 form a stopper mechanism 50 for restricting the seat back frame 12 (seat back 3) from pivoting (rotating) to a foremost position and a rearmost position. A driving sprocket 36 serving as a first connecting shaft side rotating member is housed in and supported by the gear housing 29c so as to be rotatable relative to an axis of the gear 33. Specifically, the driving sprocket 36 is connected to the driven cam 52 and the gear 33 in a manner where a serrated shaft 36a of the driving sprocket 36 penetrates through the driven cam 52 and the gear 33 so as to be rotatable integrally with the driven cam 52 and the gear 33. The driving sprocket 36 is rotatably supported by the gear housing 29c at a shaft portion 36b of the driving sprocket 36. Further, a fitting hole 36c is formed at the shaft portion 36b, and the first end portion 23a of the connecting shaft 23 penetrating through the housing case 29 is fit to the fitting hole 36c. Further, a shaft portion 36d is formed at the end of the driving sprocket 36 so as to face the housing cover 30, and the driving sprocket 36 is rotatably supported by the housing cover 30 at the shaft portion 36d of the driving sprocket 36.

A driven sprocket 37 serving as a first rotating shaft side rotating member is housed in and supported by the housing main body 29d so as to be rotatable relative to the rotation axis 01. A shaft portion 37a is formed at the driven sprocket 37 so as to protrude at either side in the seat direction, and the driven sprocket 37 is rotatably supported at the shaft portion 37a thereof by each of the housing main body 29d and the housing cover 30. A fitting hole 37b is formed at the shaft portion 37a of the driven sprocket 37, and the driven sprocket 37 is connected to the reclining mechanism 13 so as to be rotatable integrally with a rotating shaft of the reclining mechanism 13 (integrally with the cam for controlling meshing manner between the internal gear and the external gear). Detailed explanation of the connection between the reclining mechanism 13 and the driven sprocket 37 is abbreviated in the drawings. In this configuration, the reclining mechanism 13 is actuated in accordance with the rotation of the driven sprocket 37; accordingly, an angle of the seat back frame 12 relative to the seat cushion frame 11 may be continuously adjusted.

The housing case 29 houses a chain belt 38 serving as a first transmitting means connecting the driving sprocket 36 and the driven sprocket 37 in order to transmit power (rotation) from the driving sprocket 36 to the driven sprocket 37. The first transmitting means includes a rope-type transmitting mechanism. In this configuration, the rotation transmitted to the driving sprocket 36 is further transmitted to the driven sprocket 37 by means of the chain belt 38. The chain belt 38, the driving sprocket 36 and the driven sprocket 37 constitute a first actuating mechanism 35. A pitch circle diameter of the driven sprocket 37 is set so as to be larger than that of the driving sprocket 36, and the driving sprocket 36 and the driven sprocket 37 also constitute a third stage of the reducing mechanism.

Figure 4:
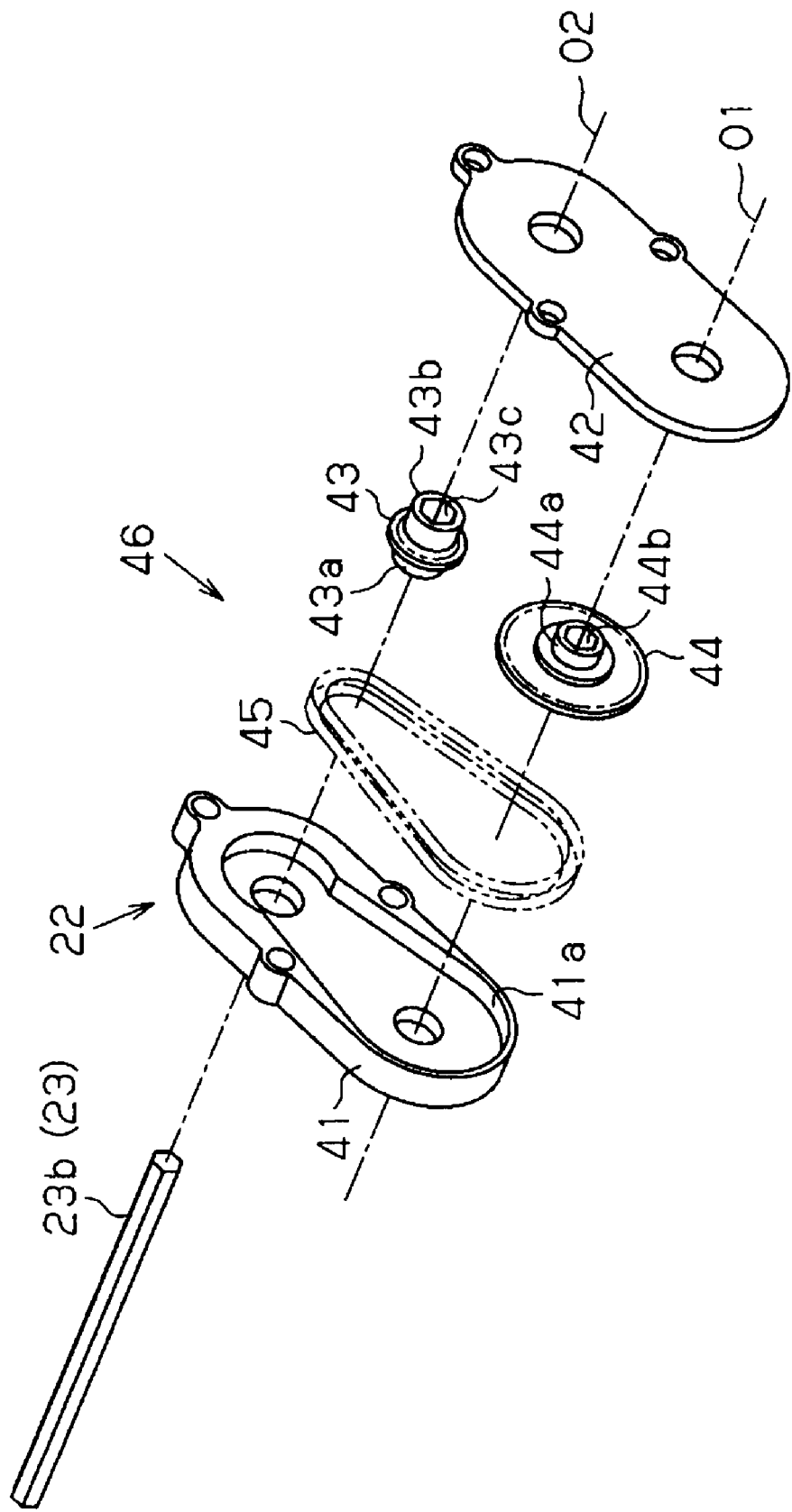
FIG. 4 illustrates an exploded perspective view indicating the embodiment.

Each member described above is integrally housed in a space formed between the housing case 29 and the housing cover 30 (first housing), and the first housing including the housing case 29 and the housing cover 30 also functions as a retainer and a bearing. On the other hand, a diagram indicating an exploded perspective view of the driven side actuating apparatus 22 is illustrated in FIG. 4. As indicated in FIG. 4, the driven side actuating apparatus 22 includes a housing case 41 made of resin and forming an external shape of the driven side actuating apparatus 22 and a housing cover 42 formed and provided so as to close an opening of the housing case 41. The housing case 41 and the housing cover 42 constitute a second housing. A front portion of the housing case 41 is formed in a half-cylinder shape with a bottom having a center point that is identical to the rotation axis 01, and an end portion of the housing case 41 is also formed in a half-cylinder shape with a bottom having a center point that is identical to the rotation axis 02. Thus, the second housing is formed in a box shape with an oval bottom.

The housing case 41 houses and supports a driving sprocket 43 serving as a second connecting shaft side rotating member so as to be rotatable relative to the rotation axis 02. The driving sprocket 43 is rotatably supported by the housing case 41 at a shaft portion 43a of the driving sprocket 43 formed so as to face the housing case 41. The driving sprocket 43 is rotatably supported by the housing cover 42 at a shaft portion 43b formed at the driving sprocket 43 so as to face the housing cover 42. A fitting hole 43c is formed on the shaft portion 43b so as to fit a second end portion 23b of the connecting shaft 23 penetrating through the housing case 41.

A driven sprocket 44 serving as a second rotating shaft side rotating member is housed in and supported by the housing case 41. A shaft portion 44a is formed at the driven sprocket 44 so as to protrude at either side in the seat direction, and the driven sprocket 44 is rotatably supported at the shaft portion 44a thereof by each of the housing case 41 and the housing cover 42. A fitting hole 44b is formed at the shaft portion 44a of the driven sprocket 44, and the driven sprocket 44 is connected to the reclining mechanism 14 so as to be rotatable integrally with a rotating shaft of the reclining mechanism 14 (integrally with the cam for controlling meshing manner between the internal gear and the external gear). Detailed explanation of the connection between the reclining mechanism 14 and the driven sprocket 44 is abbreviated in the drawings. In this configuration, the reclining mechanism 14 is actuated in accordance with the rotation of the driven sprocket 44; accordingly, an angle of the seat back frame 12 relative to the seat cushion frame 11 may be continuously adjusted.

The housing case 41 further houses a chain belt 45 serving as a second transmitting means connecting the driving sprocket 43 and the driven sprocket 44 in order to transmit power (rotation) from the driving sprocket 43 to the driven sprocket 44. The second transmitting means includes the rope-type transmitting mechanism. In this configuration, the rotation transmitted to the driving sprocket 43 is further transmitted to the driven sprocket 44 by means of the chain belt 45. The chain belt 45, the driving sprocket 43 and the driven sprocket 44 constitute a second actuating mechanism 46. In this structure, the drive force generated by the electric motor 26 is transmitted to the first actuating mechanism 35, and the drive force is further transmitted to the second actuating mechanism 46. A ratio between a pitch circle diameter of the driving sprocket 43 and a pitch circle diameter of the driven sprocket 44 is identical to the ratio between the pitch circle diameter of the driving sprocket 36 and the pitch circle diameter of the driven sprocket 37. In other word, the pitch circle diameter of the driving sprocket 43 is set so as to be identical to that of the driving sprocket 36, and the pitch circle diameter of the driven sprocket 44 is set so as to be identical to that of the driven sprocket 37. The housing case 41 includes an inner wall surface 41a formed in a pear-shape (pyriform) in its flat view in accordance with a trajectory of the movement of the chain belt 45, and the inner wall surface 41a restricts the chain belt 45 from being flexed beyond a predetermined level.

As mentioned above, each member described above is integrally housed in a space formed between the housing case 41 and the housing cover 42 (second housing), and the second housing including the housing case 41 and the housing cover 42 functions as a retainer and a bearing. In this configuration, once the electric motor 26 is actuated, the rotation speed of the electric motor 26 is reduced by means of the worm 28 and the worm wheel 31, and the rotation is transmitted to the pinion gear 32. Then, the rotation speed of the pinion gear 32 is further reduced by means of the gear 33, and the rotation is transmitted to the driving sprocket 36 of the first actuating mechanism 35. The rotation speed is further reduced by means of the chain belt 38, and the rotation is transmitted to the driven sprocket 37. The rotation transmitted to the driving sprocket 36 (first actuating mechanism 35) is also transmitted to the driving sprocket 43 of the second actuating mechanism 46 by means of the connecting shaft 23, and the rotation speed is reduced by means of the chain belt 45, and the rotation is further transmitted to the driven sprocket 44. Thus, the rotating shaft (the cam) of the reclining mechanism 14 is rotated integrally with the rotating shaft (the cam) of the reclining mechanism 13; as a result, the seat back flame 12 (seat back 3) is tilted in a direction of the rotation of the rotating shafts (the cams).

Figure 5A:
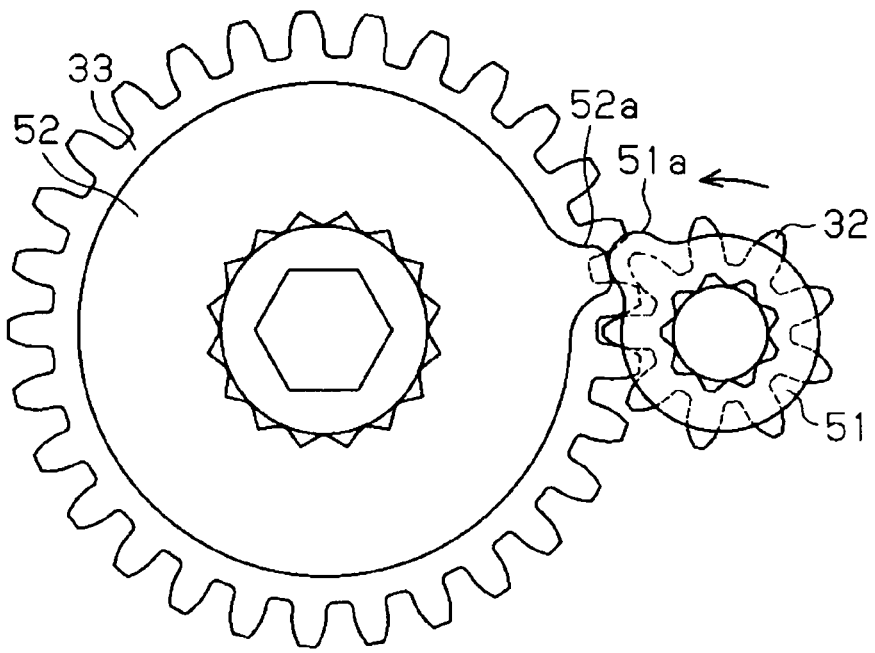
FIG. 5A illustrates an actuation of a stopper mechanism.
Figure 5B:
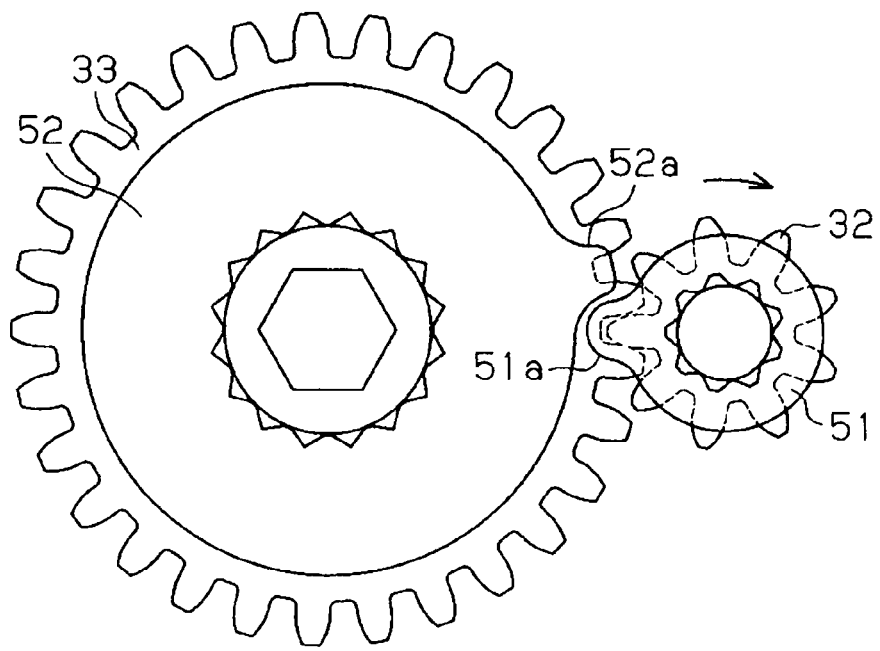
FIG. 5B illustrates the actuation of the stopper mechanism.

The stopper mechanism 50 will be explained below. A diagram illustrated in FIGS. 5A and 5B indicate an actuation of the stopper mechanism 50. As indicated in each diagram, a rotation of the pinion gear 32 is transmitted to the gear 33 with reducing the rotation. Specifically, in this example, the number of teeth of the pinion gear 32 is set to 9, and the number of teeth of the gear 33 is set to 29, and a rotation speed of the pinion gear 32 is reduced in accordance with a gear ratio between the pinion gear 32 and the gear 33.

At the driving cam 51 rotating integrally with the pinion gear 32, a driving side protrusion 51a is formed so as to protrude outwardly in a radial direction of the driving cam 51 at a predetermined angle that corresponds to a particular tooth of the pinion gear 32. At the driven cam 52 rotating integrally with the gear 33, a driven side protrusion 52a is formed so as to protrude outwardly in a radial direction of the driven cam 52 at a predetermined angle that corresponds to a particular groove (teeth groove) of the gear 33. The driving side protrusion 51a and the driven side protrusion 52a are formed so as to interfere each trajectory. Thus, as indicated in the drawing illustrated in FIG. 5A, in accordance with a rotation of the pinion gear 32 in an anticlockwise direction in the drawing and a rotation of the gear 33 corresponding to the rotation of the pinion gear 32, immediately before the particular tooth of the pinion gear 32 corresponding to the position where the driving side protrusion 51a is formed engages the particular groove of the gear 33 corresponding to the position where the driven side protrusion 52a is formed, the driving side protrusion 51a of the driving cam 51 engages the driven side protrusion 52a of the driven cam 52, as a result, the rotation of the pinion gear 32 in an anticlockwise direction is stopped. Specifically, the rotation of the pinion gear 32 is restricted under a condition where the particular tooth corresponding to the position where the driving side protrusion 51a is formed engages the particular groove corresponding to the position where the driven side protrusion 52a is formed.

While the rotation of the pinion gear 32 is restricted, when the pinion gear 32 is rotated in a clockwise direction, unless the particular tooth corresponding to the position where the driving side protrusion 51a is formed engages the particular groove corresponding to the position where the driven side protrusion 52a is formed, the pinion gear 32 is allowed to rotate. For example, as indicated in the drawing illustrated in FIG. 5B, even when the driving side protrusion 5a of the driving cam 51 is located next to the driven side protrusion 52a of the driven cam 52 in a rotational direction thereof, because the particular tooth corresponding to the position where the driving side protrusion 51a is formed does not engage the particular groove corresponding to the position where the driven side protrusion 52a is formed, the pinion gear 32 is allowed to be rotated. Further, while the gears are positioned as indicated in the drawing illustrated in FIG. 5A, when the pinion gear 32 is rotated 29 times in a clockwise direction (rotating the gear 33 9 times), immediately before the particular tooth of the pinion gear 32 corresponding to the position where the driving side protrusion 51a is formed engages the particular groove of the gear 33 corresponding to the position where the driven side protrusion 52a is formed, the driving side protrusion 51a of the driving cam 51 engages the driven side protrusion 52a of the driven cam 52 in the opposite direction, as a result, the rotation of the pinion gear 32 is restricted. In other words, a range of the number of the rotations of the pinion gear 32 is determined on the basis of the gear ratio between the pinion gear 32 and the gear 33. Thus, the rotation of the rotating shaft (the cam) of the reclining mechanism 13 transmitted to first actuating mechanism 35 by means of the pinion gear 32 and the gear 33 is restricted in a manner where the rotation of the pinion gear 32 in either direction is restricted by the stopper mechanism 50 as described above. Accordingly, the seat back frame 12 (the seat back 3) is restricted from tilting toward the foremost position and the rearmost position.

According to the embodiment described above, the first housing (the housing case 29 and the housing cover 30) into which the first end portion 23a of the connecting shaft 23 is penetrated is provided at one side of the vehicle seat in a seat width direction, and the first housing integrally houses the first actuating mechanism 35. On the other hand, the second housing (the housing case 41 and the housing cover 42) in which the second end portion 23b of the connecting shaft 23 is penetrated is provided at the other side of the vehicle seat in the seat width direction, and the second housing integrally houses the second actuating mechanism 46. Accordingly, the members described above may be installed as a unit. Because the first actuating mechanism 35 is housed within the space formed between the housing case 29 and the housing cover 30, and the second actuating mechanism 46 is housed within the space formed between the housing case 41 and the housing cover 42, even when variation occurs in the assembly process of the first and second actuating mechanisms 35 and 46, a level of the variation may be limited within a predetermined range. Thus, a level of assembly precision may be increased; as a result, a level of the synchronization between the first and second angle adjusting mechanisms 13 and 14 may be increased.

According to the embodiment described above, before the drive force generated at the electric motor 26 and transmitted to the first actuating mechanism 35 (driving sprocket 36) is completely transmitted to the driven sprocket 37 (the rotating shaft of the reclining mechanism 13) by means of the chain belt 38, the transmission of the drive force to the second actuating mechanism 46 (driving sprocket 43) by means of the connecting shaft 23 is started. Thus, a response delay of the reclining mechanism 14 to the reclining mechanism 13 may be improved; as a result, the level of the synchronization between the first and second angle adjusting mechanisms 13 and 14 may be increased.

According to the embodiment described above, by means of the rope-type transmitting mechanism, the drive force is transmitted from the driving sprocket 36 to the driven sprocket 37 and from the driving sprocket 43 to the driven sprocket 44. In this case, a length of a rope-type member (the chain belts 38 and 45) may be changed, and an arrangement of the rope-type member may be modified in an alternative manner. Thus, the distance between the rotating shaft of the first angle adjusting mechanism 13 and the connecting shaft 23 (the first end portion 23a of the connecting shaft 23) and the distance between the rotating shaft of the second angle adjusting mechanism 14 and the connecting shaft 23 (the second end portion 23b of the connecting shaft 23) may be flexibly modified. Especially, because the driving sprocket 36 is connected to the driven sprocket 37 by means of a single member such as the chain belt 38, and the driving sprocket 43 is connected to the driven sprocket 44 by means of the single member such as a single chain belt 45, an increment of the number of the parts is kept to the minimum.

According to the embodiment described above, the rotation speed of the electric motor 26 transmitted via the worm gear is reduced by means of the reducing mechanism including the pinion gear 32 and the gear 33, and an increased output is transmitted to the first actuating mechanism 35. Further, because the reducing mechanism is housed within the space formed between the housing case 29 and the housing cover 30 so as to be integral with the first actuating mechanism 35, a level of the variation occurred in the assembly process may be limited within a predetermined range.

According to the embodiment described above, by means of the stopper mechanism 50 whose structure is simple with the driving cam 51 and the driven cam 52, the angle of the seat back frame 12 (seat back 3) relative to the seat cushion frame 11 (seat cushion 2) may be set within a predetermined range of angle including a front limited position and a rear limited position. Accordingly, the seat back frame 12 (seat back 3) may be easily rotated so as to be in the predetermined limited positions such as the front limited position or the rear limited position. Further, the predetermined range of angle is easily adjusted by providing a plurality of the driving side protrusion 51a and the driven side protrusion 52a or by modifying the angles at which the driving side protrusion 51a and the driven side protrusion 52a are formed.

Further, because the rotation is restricted by the stopper mechanism 50 at a position where the output is not increased by means of the first actuating mechanism 35, an excessive load may not be applied to the stopper mechanism 50. Further, in this configuration, when the seat back frame 12 (seat back 3) is tilted toward a foremost position or a rearmost position, because the rotation from the electric motor 26 is restricted by the stopper mechanism 50, an excessive load caused by the restriction of the seat back movement may not be applied to the chain belt 38, as a result, slip due to wear and stretch of the chain belt 38 may be avoided.

Furthermore, in this configuration, a part of the reducing mechanism including the pinion gear 32 and the gear 33 is used for the stopper mechanism 50. Thus, comparing to a case when each of the stopper mechanism and the reducing mechanism is used only for its purpose, the number of parts may be reduced in this configuration, at the same time, this may enable disadvantages such as energy loss caused by the mechanism using a lot of parts and noise due to the meshing of the gears may be decreased. Especially, the driving cam 51 and the driven cam 52 are not contacting each other unless the driving side protrusion 51a of the driving cam 51 engages the driven side protrusion 52a of the driven cam 52, this may enable the disadvantages such as the energy loss or the noise due to gear meshing to be avoided.

According to the embodiment, because the reducing mechanism including the pinion gear 32 and the gear 33 and the first actuating mechanism 35 are housed in a single housing (first housing), distances between each rotation axis of each member may be kept preferably. Accordingly, noise of the gears or smears of grease on a surface of the seat may be avoided.

Figure 6:
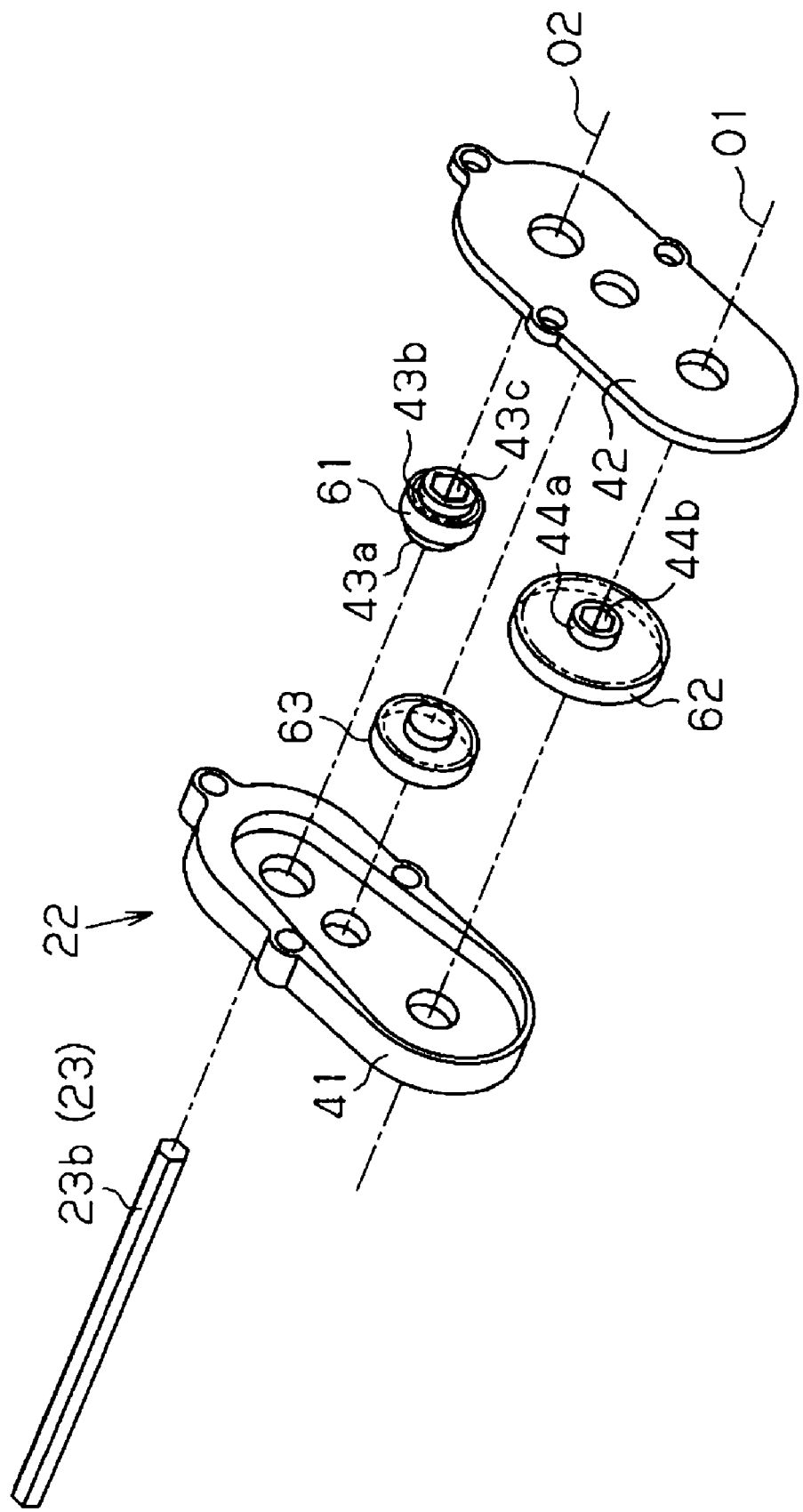
FIG. 6 illustrates an exploded perspective view indicating a modified embodiment.

The embodiment described above may be modified as follows. As indicated in the drawing illustrated in FIG. 6, at the driven side actuating apparatus 22, a drive gear 61 may be used instead of the driving sprocket 43, a driven gear 62 may be used instead of the driven sprocket 44, and an idle gear 63 may be provided between the drive gear 61 and the driven gear 62 instead of the chain belt 45 in order to transmit the drive force from the drive gear 61 to the driven gear 62. In this case, a reduction gear ratio between the drive gear 61 and the driven gear 62 is set so as to be identical to the reduction gear ratio between the driving sprocket 36 and the driven sprocket 37 of the motor side actuating apparatus 21. Thus, the drive force is transmitted from the drive gear 61 to the driven gear 62 by means of the idle gear 63 serving as a gear mechanism. In this modification, a life of the mechanism may be extended by preferably securing rigidity of each gear. Further, a plurality of the idle gear may be provided between the drive gear 61 and the driven gear 62 as long as the reduction gear ratio between/among the gears is identical to reduction gear ratio between the driving sprocket 36 and the driven sprocket 37. Furthermore, a gear mechanism such as the idle gear 63 may be provided at the motor side actuating apparatus 21.

The driving sprocket 36 and the driven sprocket 37 may be replaced by each other, and the driving sprocket 43 and the driven sprocket 44 may be replaced by each other. In other word, the driving sprocket 36 may be connected to the rotating shaft of the reclining mechanism 13, the driving sprocket 43 may be connected to the rotating shaft of the reclining mechanism 14, the driven sprocket 37 may be connected to the first end portion 23a of the connecting shaft 23, and the driven sprocket 44 may be connected to the second end portion 23b.

In the embodiment described above, the rotation transmitted to the pinion gear 32 is further transmitted to the gear 33 in a manner where its speed is reduced, however, the rotation may be transmitted without reducing its speed. In the embodiment described above, the rotation transmitted to the driving sprocket 36 is further transmitted to the driven sprocket 37 by reducing its speed, however, the rotation may be transmitted without reducing its speed. Furthermore, in the embodiment, the rotation transmitted to the driving sprocket 43 is further transmitted to the driven sprocket 44 by reducing its speed, however, the rotation may be transmitted without reducing its speed.

The rope-type transmitting mechanism by use of the chain belts 38 and 45 may be altered by another rope-type transmitting mechanism by use of a belt or a rope. The belt and the rope may be closed or opened. The seat reclining apparatus according to the embodiment described above may be applied to a seat being bent at the center thereof. Specifically, the seat reclining apparatus may be applied to the seat back 3 comprised of an upper portion and a lower portion, and the upper portion is pivoted relative to the lower portion by means of the apparatus.

Further, the seat reclining apparatus according to the embodiment may be applied to a retractable seat being folded so as to be in an appropriate limited position.

Thus, the first housing into which the first end portion of the connecting shaft is penetrated is provided at one side of the seat in a seat width direction, and the first housing integrally houses the first actuating mechanism. On the other hand, the second housing in which the second end portion of the connecting shaft is penetrated is provided at the other side of the seat in the seat width direction, and the second housing integrally houses the second actuating mechanism. Accordingly, the members described above may be installed as a unit. Because the first actuating mechanism is housed in the first housing, and the second actuating mechanism is housed in the second housing, even when variation occurs in the assembly process of the first and second actuating mechanisms, and a level of the variation may be limited within a predetermined range. Thus, a level of assembly precision may be increased.

According to another aspect of the present invention, the drive force of the electric drive source is transmitted to the first connecting shaft side rotating member and then transmitted to the first rotating shaft side rotating member.

Thus, before the drive force generated at the electric drive source and transmitted to the first actuating mechanism (the first connecting shaft side rotating member) is completely transmitted to the rotating shaft of the first angle adjusting mechanism (the first rotating shaft side rotating member) by means of the first transmitting device, the transmission of the drive force to the second actuating mechanism (the second connecting shaft side rotating member) by means of the connecting shaft is started. Thus, a response delay of the second angle adjusting mechanism to the first angle adjusting mechanism may be improved; as a result, the level of the synchronization between the first and second angle adjusting mechanisms and may be increased.

According to further aspect of the present invention, each of the first and second transmitting devices includes a gear mechanism or a rope-type transmitting mechanism.

Thus, by means of the gear mechanism and the rope-type transmitting mechanism, the drive force is transmitted from the first connecting shaft side rotating member to the first rotating shaft side rotating member and from the second connecting shaft side rotating member to the second rotating shaft side rotating member.

According to other aspect of the present invention, the seat reclining apparatus for vehicle further includes a reducing mechanism including a first gear and a second gear and housed in the first housing, the first gear is rotated by the drive force generated by the electric drive source, the second gear is meshing with the first gear in order to transmit the drive force to the first actuating mechanism, and a diameter of the first gear is smaller than that of the second gear.

Thus, the rotation speed of the electric drive source is reduced by means of the reducing mechanism including the first gear and the second gear, and an increased output is transmitted to the first actuating mechanism. Further, because the reducing mechanism is housed within the first housing so as to be integral with the first actuating mechanism, a level of the variation occurred in the assembly process may be limited within a predetermined range.

According to yet another aspect of the present invention, the seat reclining apparatus for vehicle further includes a stopper mechanism including a driving cam rotating so as to be integral with the first gear and a driven cam rotating so as to be integral with the second gear, the driving cam including a driving side protrusion formed at a predetermined angle, the driven cam including a driven side protrusion at a predetermined angle, wherein, in accordance with the rotation of the first gear and the rotation with the second gear rotated simultaneously with the first gear, the driving side protrusion engages the driven side protrusion so that the rotation of the first gear is stopped, accordingly the angle of the second frame relative to the first frame is adjustable within a predetermined range.

Thus, by means of the stopper mechanism whose structure is simple, the angle of the second frame (the second portion) relative to the first frame (the first portion) may be set within a predetermined range of angle including a front limited position and a rear limited position. Accordingly, the second frame (second portion) may be easily rotated so as to be in the predetermined limited positions such as the front limited position or the rear limited position (e.g., retracted position). Further, the predetermined range of angle is easily adjusted by providing a plurality of the driving side protrusion and the driven side protrusion or by modifying the angles at which the driving side protrusion and the driven side protrusion are formed. Further, because the rotation is restricted by the stopper mechanism at a position where the output is not increased by means of the first actuating mechanism, an excessive load may not be applied to the stopper mechanism.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A reclining apparatus for use with a vehicular seat having a seat cushion and a seat back rotatable relative thereto, comprising:
   a first angle adjusting mechanism provided at a first side of the seat in a seat width direction;
   a second angle adjusting mechanism provided at a second side of the seat in the seat width direction, the first angle adjusting mechanism and the second angle adjusting mechanism adjusting an angle of a second frame relative to a first frame, the first frame forming a main structure of a first portion of the seat, and the second frame forming a main structure of a second portion of the seat;
   a connecting shaft extending in the seat width direction and being eccentric to a center of a rotating shaft of each of the first angle adjusting mechanism and the second angle adjusting mechanism;
   a first actuating mechanism including
      a first rotating shaft side rotating member rotating relative to the center of the rotating shaft of the first angle adjusting mechanism,
      a first connecting shaft side rotating member that rotates integrally with a first end portion of the connecting shaft, and
      a first transmitting means for transmitting the rotation between the first rotating shaft side rotating member and the first connecting shaft side rotating member;
   a second actuating mechanism including
      a second rotating shaft side rotating member rotating relative to the center of the rotating shaft of the second angle adjusting mechanism,
      a second connecting shaft side rotating member that rotates integrally with a second end portion of the connecting shaft, and
      a second transmitting means for transmitting the rotation between the second rotating shaft side rotating member and the second connecting shaft side rotating member;
   an electric drive source supplying a drive force to the first actuating mechanism for driving thereof, the connecting shaft transmitting the drive force from the first actuating mechanism to the second actuating mechanism;
   a first housing including a first closed space accommodating the first actuating mechanism completely, the first end portion of the connecting shaft being inserted into the first housing; and
   a second housing including a second closed space accommodating the second actuating mechanism completely, the second end portion of the connecting shaft being inserted into the second housing.

2. The reclining apparatus according to claim 1, wherein the drive force of the electric drive source is transmitted to the first connecting shaft side rotating member and then transmitted to the first rotating shaft side rotating member.

3. The reclining apparatus according to claim 1, wherein each of the first and second transmitting means includes a gear mechanism.

4. The reclining apparatus according to claim 1, wherein each of the first and second transmitting means includes a belt transmitting mechanism.

5. The reclining apparatus according to claim 4, wherein the belt transmitting mechanism includes a chain belt.

6. The reclining apparatus according to claim 1, further comprising a reducing mechanism having a first gear and a second gear and being housed in the first housing, the first gear being rotated by the drive force generated by the electric drive source, the second gear meshing with the first gear in order to transmit the drive force to the first actuating mechanism, and a diameter of the first gear being smaller than a diameter of the second gear.

7. The reclining apparatus according to claim 6, further comprising a stopper mechanism including
    a driving cam that rotates integrally with the first gear, and
    a driven cam that rotates integrally with the second gear, the driving cam including a driving side protrusion formed at a predetermined angle, and the driven cam including a driven side protrusion at a predetermined angle,
    wherein, in accordance with a rotation of the first gear and a rotation of the second gear rotated simultaneously with the first gear, the driving side protrusion engages the driven side protrusion so that the rotation of the first gear is stopped, whereby the angle of the second frame relative to the first frame is adjustable within a predetermined range.

8. The reclining apparatus according to claim 1, wherein the first and second housings each include a housing case and a housing cover.

9. A reclining apparatus for use with a vehicular seat having a seat cushion and a seat back rotatable relative thereto, comprising:
    a first angle adjusting mechanism provided at one side of the seat in a seat width direction;
    a second angle adjusting mechanism provided at the other side of the seat in the seat width direction, the first angle adjusting mechanism and the second angle adjusting mechanism for adjusting an angle of a second frame relative to a first frame, the first frame forming a main structure of a first portion of the seat, and the second frame forming a main structure of a second portion of the seat;
    a connecting shaft extending in the seat width direction and being eccentric to a center of a rotating shaft of each of the first angle adjusting mechanism and the second angle adjusting mechanism;
    a first actuating mechanism including
        a first rotating shaft side rotating member rotating relative to the center of the rotating shaft of the first angle adjusting mechanism,
        a first connecting shaft side rotating member rotating so as to be integral with a first end portion of the connecting shaft, and
        a first transmitting means for transmitting the rotation between the first rotating shaft side rotating member and the first connecting shaft side rotating member;
    a second actuating mechanism including
        a second rotating shaft side rotating member rotating relative to the center of the rotating shaft of the second angle adjusting mechanism,
        a second connecting shaft side rotating member rotating so as to be integral with a second end portion of the connecting shaft, and
        a second transmitting means for transmitting the rotation between the second rotating shaft side rotating member and the second connecting shaft side rotating member;
    an electric drive source supplying a drive force to the first actuating mechanism for driving thereof, the connecting shaft transmitting the drive force supplied to the first actuating mechanism to the second actuating mechanism;
    a first housing accommodating the first actuating mechanism and receiving the first end portion of the connecting shaft inserted therein;
    a second housing accommodating the second actuating mechanism and receiving the second end portion of the connecting shaft inserted therein; and
    a reducing mechanism having a first gear and a second gear and being housed in the first housing, the first gear being rotated by the drive force generated by the electric drive source, the second gear meshing with the first gear in order to transmit the drive force to the first actuating mechanism, and a diameter of the first gear being smaller than a diameter of the second gear.

* * * * *